United States Patent [19]
Berry

[11] Patent Number: 5,299,768
[45] Date of Patent: Apr. 5, 1994

[54] MIXING BOWL SUPPORT APPARATUS

[76] Inventor: Dallas W. Berry, 706 15th Ave. S., North Myrtle Beach, S.C. 29582

[21] Appl. No.: 900,672

[22] Filed: Jun. 19, 1992

[51] Int. Cl.$^5$ .............................. A47J 47/16
[52] U.S. Cl. .................. 248/145.6; 248/154; 248/311.2; 248/312.1
[58] Field of Search .............. 248/145.6, 146, 152, 248/154, 311.2, 346.1, 231.8, 318, 312.1

[56] References Cited

U.S. PATENT DOCUMENTS

| | | | |
|---|---|---|---|
| 999,202 | 8/1911 | Browning | 248/146 |
| 1,056,669 | 3/1913 | Harris | 248/154 |
| 2,563,698 | 8/1951 | Whitebread | 248/154 |
| 3,532,313 | 10/1970 | Brayton | 248/154 X |
| 4,084,701 | 4/1978 | White | 248/154 X |
| 4,093,166 | 6/1978 | Iida | 248/311.2 X |
| 4,896,858 | 1/1990 | Sokolski et al. | 248/231.8 X |
| 5,094,415 | 3/1992 | Revette et al. | 248/154 X |

FOREIGN PATENT DOCUMENTS

| | | | |
|---|---|---|---|
| 511902 | 6/1952 | Belgium | 248/311.2 |
| 241138 | 10/1925 | United Kingdom | 248/154 |

*Primary Examiner*—Hien H. Phan
*Assistant Examiner*—Clark F. Dexter
*Attorney, Agent, or Firm*—Leon Gilden

[57] ABSTRACT

A cage member arranged for supporting a mixing bowl is utilized in automatic mixing machines and includes an annular band having a base plate positioned below the annular band in a coaxially aligned relationship, with a plurality of support bands extending from the base plate to the cylindrical band. L-shaped locking flanges are pivotally mounted in a spaced relationship about the cylindrical band for positioning over an upper edge of an associated bowl structure. A modification of the invention includes the base plate resiliently mounted onto an underlying positioning cup for disengagement of a bowl captured between the base plate and the locking flanges.

3 Claims, 4 Drawing Sheets

MIXING BOWL SUPPORT APPARATUS

BACKGROUND OF THE INVENTION

1. Field of the Invention

The field of invention relates to cooking utensils, and more particularly pertains to a new and improved mixing bowl support apparatus arranged to support a mixing bowl utilized within a cooking environment.

2. Description of the Prior Art

Mixing bowls such as those utilized in blenders and mixers and the like have heretofore not been afforded the convenience of support structure to permit their ease of manipulation relative to the mixing machine and a manipulation of the bowl relative to mixing structure.

Mixing bowls such as those utilized in automatic mixing machines and the like are typically of symmetrical and smooth construction. Manipulation of such bowls, particularly in a kitchen environment associated with cooking oils and fluids, directs the user of such equipment to frequently drop such bowl structure effecting their breakage and the like. The instant invention attempts to overcome deficiencies of the prior art by providing for a mixing bowl support structure permitting ease of manipulation such as in the pouring and manual manipulation of the bowl structure relative to the mixing organization. Prior art bowl structures associated with a cooking environment have been addressed in the prior art and exemplified by U.S. Pat. No. 284,344 wherein a mixing bowl includes an integral handle mounted thereto.

U.S. Pat. No. 4,959,517 to Jump, et al. sets forth a mixing bowl having a stirring structure securable to an upper distal end of the mixing bowl.

U.S. Pat. No. 4,549,811 to Schiff, et al. sets forth a mixing bowl having a splatter guard mounted over the mixing bowl permitting projection of stirring beaters directed therethrough.

U.S. Pat. No. 3,683,452 to Rickmeier, Jr., et al. sets forth a handle structure arranged for mounting to a kitchen bowl.

As such, it may be appreciated that there continues to be a need for a new and improved mixing bowl support apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of mixing bowl apparatus now present in the prior art, the present invention provides a mixing bowl support apparatus wherein the same is arranged for the support of a mixing bowl for ease of manipulation thereof. As such, the general purpose of the present invention, which will be described subsequently in greater detail, is to provide a new and improved mixing bowl support apparatus which has all the advantages of the prior art mixing bowl apparatus and none of the disadvantages.

To attain this, the present invention provides a cage member arranged for supporting a mixing bowl utilized in automatic mixing machines, including a cylindrical band having a base plate positioned below the cylindrical band in a coaxially aligned relationship, with the plurality of support bands extending from the base plate to the cylindrical band. L-shaped locking flanges are pivotally mounted in a spaced relationship about the cylindrical band for positioning over an upper edge of an associated bowl structure. A modification of the invention includes the base plate resiliently mounted onto an underlying positioning cup for disengagement of a bowl captured between the base plate and the locking flanges.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved mixing bowl support apparatus which has all the advantages of the prior art mixing bowl apparatus and none of the disadvantages.

It is another object of the present invention to provide a new and improved mixing bowl support apparatus which may be easily and efficiently manufactured and marketed.

It is a further object of the present invention to provide a new and improved mixing bowl support apparatus which is of a durable and reliable construction.

An even further object of the present invention is to provide a new and improved mixing bowl support apparatus which is susceptible of a low cost of manufacture with regard to both materials and labor, and which accordingly is then susceptible of low prices of sale to the consuming public, thereby making such mixing bowl support apparatus economically available to the buying public.

Still yet another object of the present invention is to provide a new and improved mixing bowl support apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
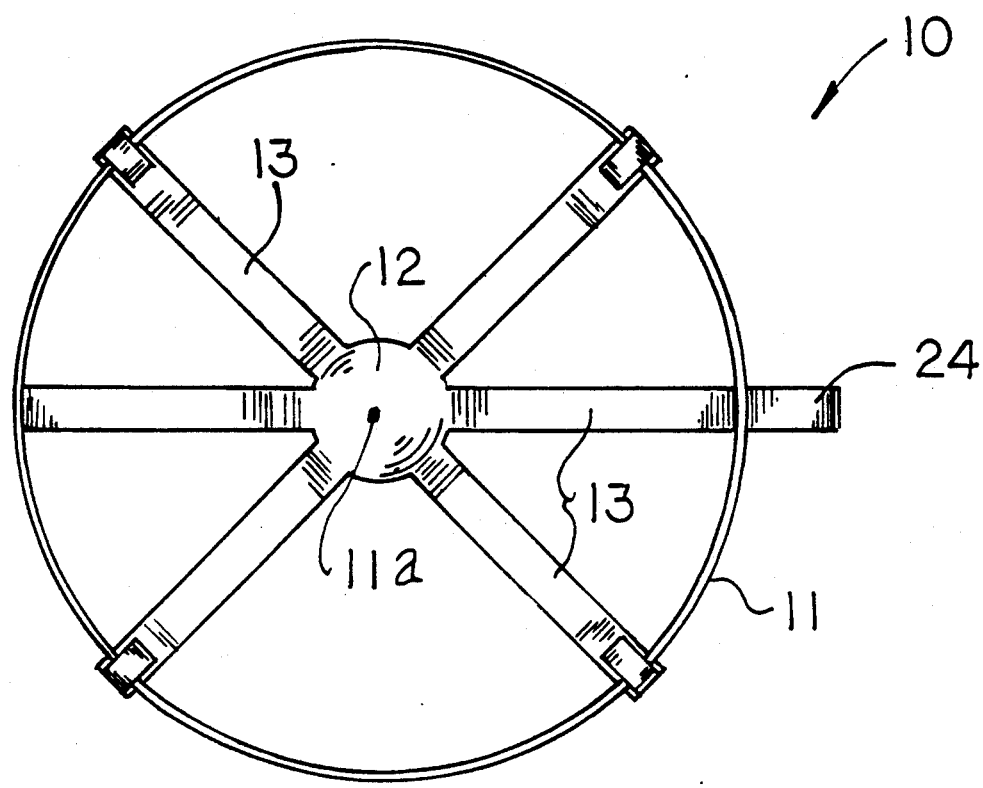
FIG. 1 is an orthographic top view of the instant invention.

With reference now to the drawings, and in particular to FIGS. 1 to 9 thereof, a new and improved mixing bowl support apparatus embodying the principles and concepts of the present invention and generally designated by the reference numerals 10 and 10a will be described.

More specifically, the mixing bowl support apparatus 10 of the instant invention essentially comprises a cylindrical band 11 defined about an axis 11a, having an annular base plate 12 orthogonally oriented relative to the axis 11a positioned below the band 11. Arcuate support bands 13, having an upper side with a concave configuration, extend from a periphery of the base plate 12 to the cylindrical band 11. Plural pairs of pivot flanges 15, with each flange of said pair of flanges, arranged in a parallel relationship relative to an adjacent flange orient the pairs of flanges in a spaced relationship about the outer surface of the cylindrical band 11, with an L-shaped lock flange 16 pivotally mounted within each pair of flanges 15. The lock flange 16 includes a hinge tube 16a at a lower distal end of the L-shaped lock flange 16, with the lock flange pivoted to extend an upper arm over the cylindrical band 11 to secure a bowl (not shown) within the support structure. The hinge tube 16a receives a fastener rod 17 therethrough and is received by the flanges 15.

Figure 6:
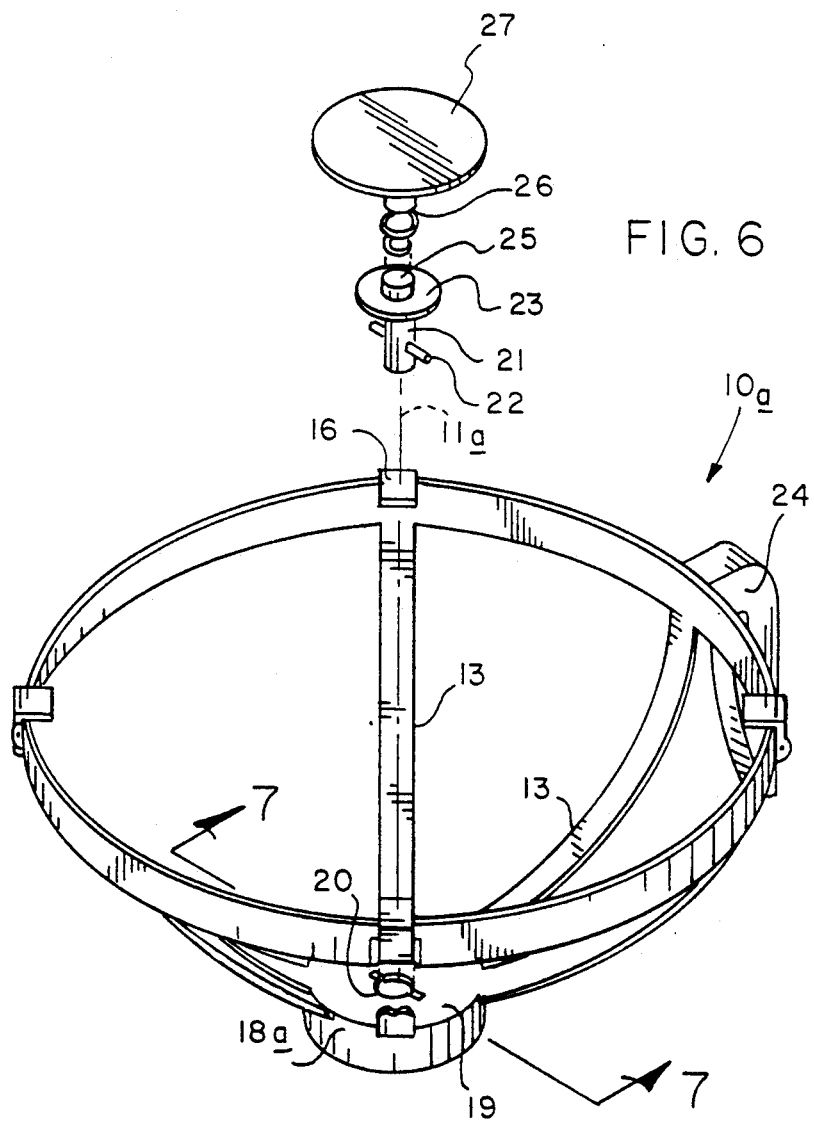
FIG. 6 is an isometric illustration of a modified aspect of the invention.
Figure 8:
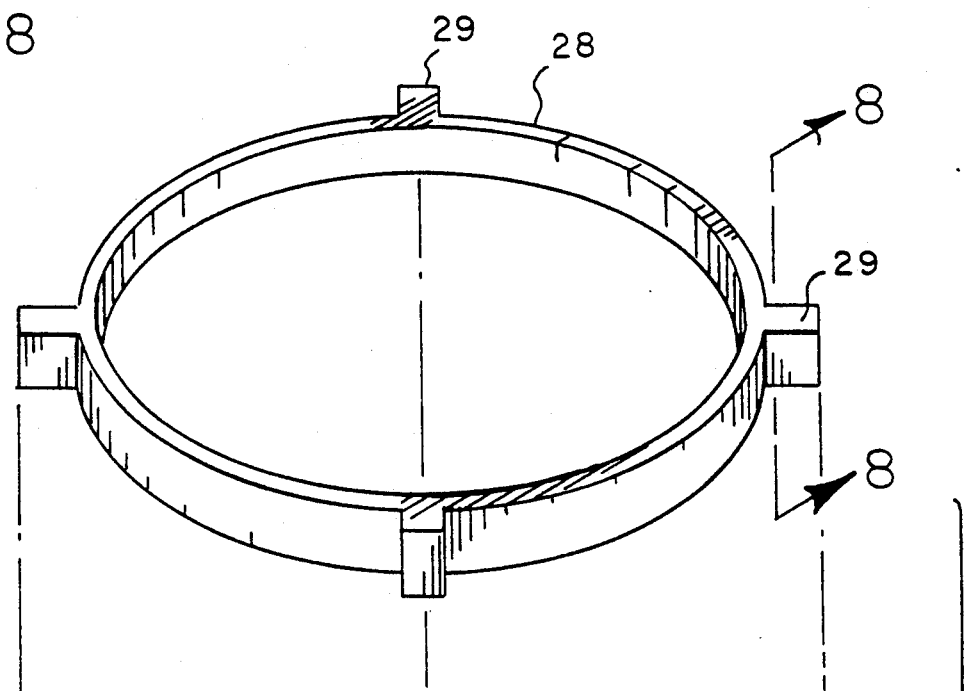
FIG. 8 is an orthographic view, taken along the lines 8—8 of FIG. 9 in the direction indicated by the arrows.

The apparatus 10a, as illustrated in FIG. 6 for example, includes the base plate 27 separated from a positioning cup 18 having a cup top wall 19 orthogonally oriented relative to the axis 11a and positioned below the band 11. The positioning cup 18 includes a downwardly directed cylindrical side wall 18a to receive a boss portion of a mixing device (not shown). A positioning cup top wall 19 includes an elongate top wall slot 20 having a central bore, with bore leg openings diametrically directed on opposed sides of the bore. A support rod 21 coaxially aligned with the axis 11a includes rod legs 22 orthogonally mounted to the support rod lower distal end thereof, wherein the support rod 21 is directed through the central bore and the support rod legs 22 are directed through the bore leg openings, whereupon projection of the support rod 21 into the slot 20 and subsequent rotation thereof secures and positions the rod legs 22 below the cup top wall 19. A support rod flange plate 23 is fixedly and orthogonally mounted adjacent an upper distal end of the support rod 21, with the flange plate 23 having a flange plate cylindrical spring boss 25 integrally and fixedly mounted medially to a top surface thereof. A coil spring member 26 has its lower end portion secured to the spring boss 25 and its upper end fixedly mounted to a modified base plate 27. In this manner, the base plate 27, when the support rod 21 is secured within the positioning cup 18, biases a bowl member (not shown) between the base plate 27 and the L-shaped lock flanges 16.

Figure 2:
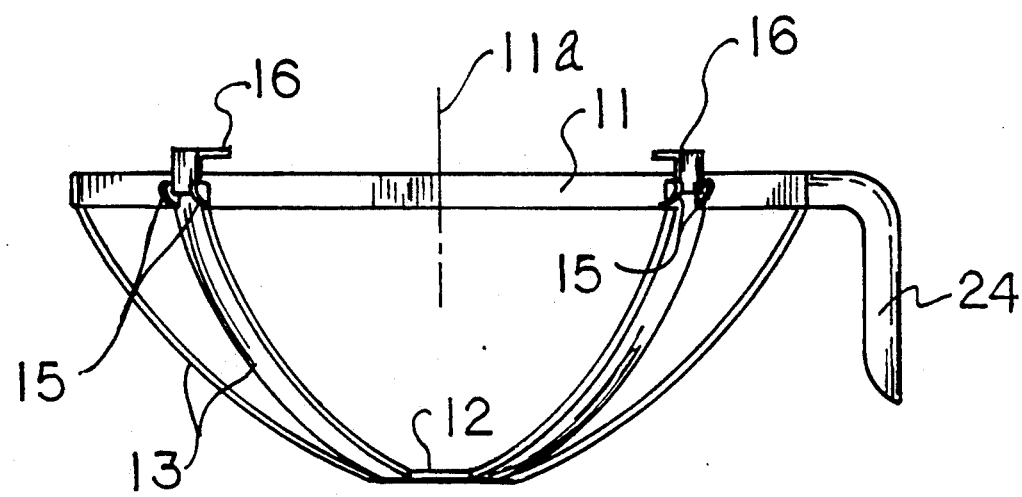
FIG. 2 is an orthographic side view of the instant invention.
Figure 4:
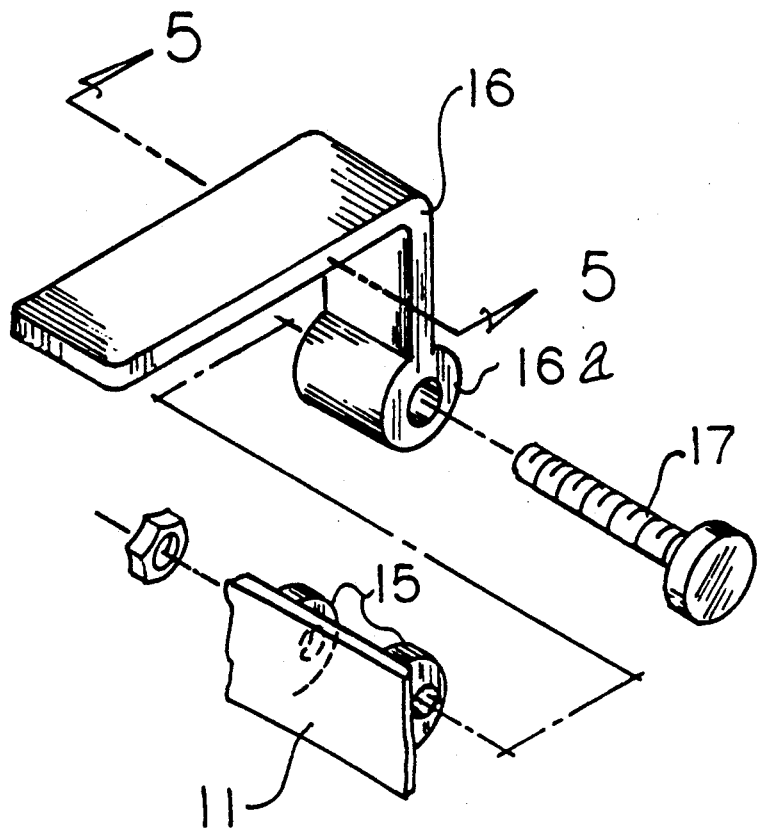
FIG. 4 is an enlarged isometric illustration of section 4 as set forth in FIG. 3.
Figure 3:
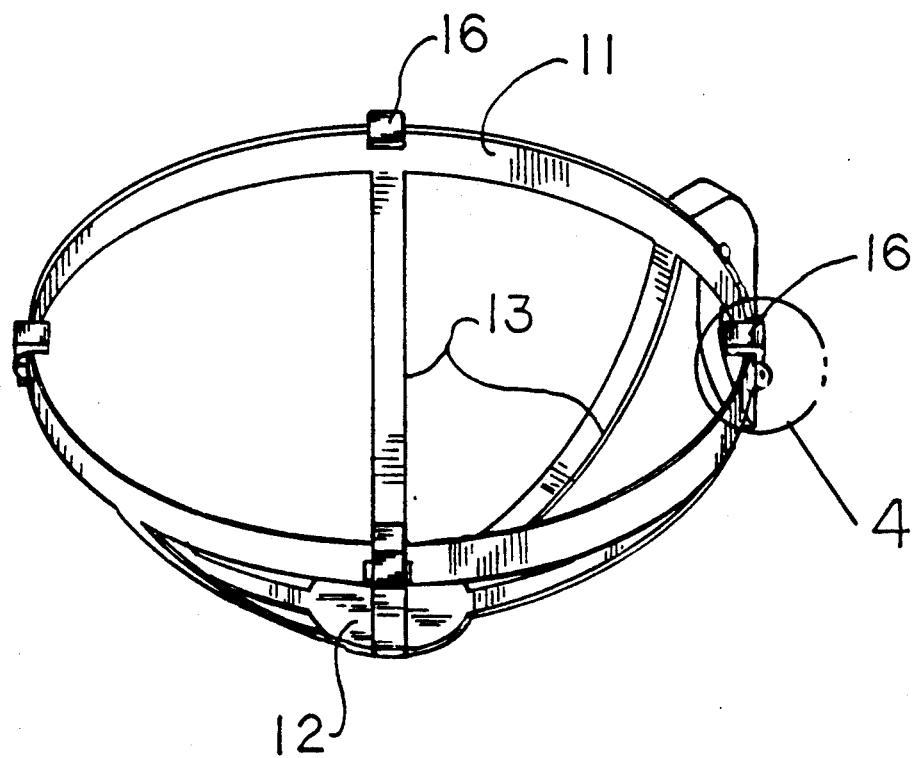
FIG. 3 is an isometric illustration of the instant invention.
Figure 5:
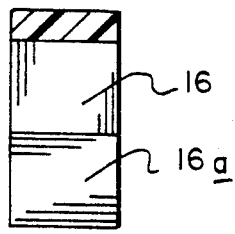
FIG. 5 is an orthographic view, taken along the lines 5—5 of FIG. 4 in the direction indicated by the arrows.
Figure 7:
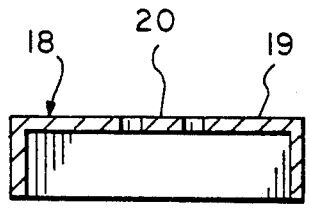
FIG. 7 is an orthographic view, taken along the lines 7—7 of FIG. 6 in the direction indicated by the arrows.

It should be noted that the embodiments 10, as well as 10a, of the FIGS. 2 and 6 for example, provide L-shaped handle member 24 mounted fixedly to the cylindrical band 11 projecting exteriorly of the cylindrical band and directed downwardly thereof for ease of manipulation of a bowl when secured within the apparatus.

Figure 9:
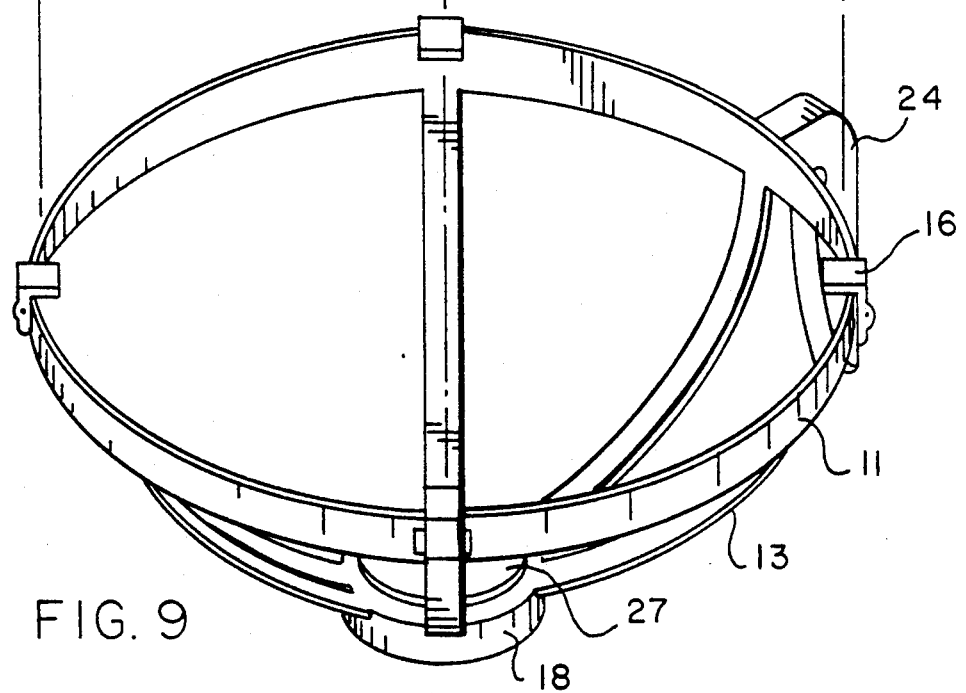
FIG. 9 is an isometric illustration of the apparatus utilizing a spacer plate for accommodating a bowl of diminished diameter.

The FIG. 9 is arranged to further include the use of a cylindrical spacer ring 28 having projections 29. The projections 29 are of a resilient construction to secure and position the spacer ring 28 within the band 11 in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A mixing bowl support apparatus, comprising,
   a cylindrical band, the cylindrical band defined about a band axis,
   and
   a positioning cup positioned below the cylindrical band orthogonally oriented relative to the band axis,
   and
   a plurality of support bands extending from the positioning cup to the cylindrical band, with each of the support bands having a top surface, and each top surface of a concave configuration, and the cylindrical band includes a plurality of pairs of pivot flanges, each pair of pivot flanges includes a first flange and a second flange arranged in a parallel relationship relative to one another, with the pairs of pivot flanges spaced equally about the cylindrical band fixedly mounted thereto, and an L-shaped lock flange pivotally mounted within each pair of pivot flanges, each L-shaped lock flange including a hinge tube mounted at a lower distal end of the lock flange, and a flange pivot axle directed through the hinge tube and into each pair of pivot flanges, and the positioning cup includes a cylindrical side wall and a top wall, with the cylindrical side wall directed below the top wall, and the top wall including a top wall slot, the top wall slot including a central bore coaxially oriented relative to the band axis, and a plurality of bore leg openings communicating with the central bore diametrically aligned on opposed sides of the central bore and a support rod, the support rod slidably received through the central bore, and the support rod including support rod legs fixedly and orthogonally mounted to the support rod adjacent a lower distal end of the support rod, the legs received through the bore leg openings, and a flange plate fixedly mounted to an upper distal end of the support rod, the flange plate including a cylindrical boss member mounted medially of the flange plate coaxially aligned with the band axis, and a spring member having a spring member lower distal end secured tot he spring boss and a spring upper distal end, and a base plate, with the spring upper distal end secured to the base plate and the base plate orthogonally oriented to the band axis, the band axis medially intersecting the base plate to secure a bowl member between the base plate and the lock flanges.

2. An apparatus as set forth in claim 1 including an L-shaped handle mounted to the cylindrical band, the L-shaped handle projecting exteriorly and below the cylindrical band.

3. An apparatus as set forth in claim 2 including a cylindrical spacer ring arranged within the cylindrical band coaxially aligned relative to the band axis, with the cylindrical spacer ring including a plurality of resilient ring projections oriented between the cylindrical spacer ring and the cylindrical band.

* * * * *